United States Patent [19]

Schoutteten

[11] Patent Number: 5,151,319

[45] Date of Patent: Sep. 29, 1992

[54] ELECTRIFIED TAPE FOR ENCLOSURE FENCES

[75] Inventor: Bruno Schoutteten, Comines, France

[73] Assignees: Schoutteten & Froidure S.A., Comine; S.A. Copel Industrie, Houplines, France

[21] Appl. No.: 735,707

[22] Filed: Jul. 26, 1991

Related U.S. Application Data

[63] Continuation of Ser. No. 332,980, Apr. 4, 1989, abandoned.

[30] Foreign Application Priority Data

Oct. 24, 1988 [FR] France ............................. 88 14962

[51] Int. Cl.⁵ ............................................. H01B 7/08
[52] U.S. Cl. .................................. 428/257; 428/253; 139/404
[58] Field of Search ................ 428/253, 257; 139/404

[56] References Cited

FOREIGN PATENT DOCUMENTS

| 0104669 | 4/1984 | European Pat. Off. . |
| 0256841 | 2/1988 | European Pat. Off. . |
| 0268838 | 6/1988 | European Pat. Off. . |
| 0274454 | 7/1988 | European Pat. Off. . |
| 0279794 | 8/1988 | European Pat. Off. . |
| 2200854 | 8/1990 | Japan . |
| 0748559 | 5/1956 | United Kingdom . |

OTHER PUBLICATIONS

Copy of French Search Report for French Application No. 88.14962.

Primary Examiner—George F. Lesmes
Assistant Examiner—Beverly A. Pawlikowski
Attorney, Agent, or Firm—Sandler, Greenblum & Bernstein

[57] ABSTRACT

This electrified tape for enclosure fences, notably of cattle grazing fields, comprises a flexible support layer having a network of electric conductors integrated in the tape. The support layer comprises means for imparting a dimensional stability to the network of electric conductors, in the form of a weft texture and a warp texture interwoven by means of a knitted warp of which the stitches lock each intersection between warp and weft yarns and encompass the wires of the network of electric conductors. This invention is applicable notably to textile processes.

8 Claims, 1 Drawing Sheet

ELECTRIFIED TAPE FOR ENCLOSURE FENCES

This application is a continuation of Ser. No. 07/332,980, filed Apr. 4, 1989, now abandoned.

BACKGROUND OF THE INVENTION

1. Field of the Invention

The present invention relates to an electrified tape for use in the domain of farming or cattle enclosure fences.

2. Background and Relevant Materials

To keep cattle inside a grazing-ground or pasture, farmers are increasingly attracted by the use of electrified fences disposed at the periphery of the pasture. The advantage of an electrified fence over simple barbed wire is that the cattle are repelled by the presence of the high voltage so that the animals are prevented from being hurt by coming too close to the fence.

For obvious safety reasons, the high voltage consists only of a capacitive charge, and therefore any contact with the fence kept at a high potential produces a very low current discharge which is harmless both for humans and animals.

Though still widely in use, the electrified barbed wire is attended by many inconveniences. It is difficult to put up by reason of its inherent stiffness, and furthermore its use as a temporary fence is precluded for it is difficult to coil it up. Finally, due to its specific conception, this type of fence is dangerous since in most instances it is scarcely visible.

Therefore, in many cases the barbed wire fence is replaced by a plain metal wire, but this solution is questionable since such a wire has a poor visibility. Under these conditions, manufacturers have been led to develop devices which are very easy to use and comprise essentially an electrified tape. This tape is both light in weight and its width must be sufficient to make it visible from a reasonable distance. It should be made of a conspicuous, strong and rot-proof material. These properties are found mainly in synthetic materials which are electrically non-conducting substances. Therefore, plastic materials such as polyethylene or the like must be associated with a metal wire for obtaining an electrified tape.

Experience teaches that several wires are necessary for palliating any failure or breakage of one of them.

At present it is known to use woven tapes made as a rule of three metal wires to form the warp. However, this structure has a poor tensile strength. In fact, when the tape is stretched, it is the less elastic warp threads, namely the three metal wires, that are stressed. This poor distribution of the tractive effort led manufacturers to develop a different structure in the making of electrified tapes.

This structure consists essentially of braid in which conducting wires are incorporated. Since these conducting wires are not disposed with a longitudinal orientation in the braided tape, they can yield and elongate when a tractive effort is exerted on the tape. Therefore, this type of tape offers a good resistance. However, braiding is objectionable since it is subject to permanent distortion, notably when a braid is pulled. In this case, the wires are caused to close up, thus reducing the tape width and when the tractive effort is released, the tape does not resume its original width. This is particularly troublesome when it is desired to preserve a good tape visibility. Practical tests proved that the tape width could thus be reduced by up to 50 percent, with a consequential irreversible or permanent elongation, which is also detrimental.

SUMMARY OF THE INVENTION

It is an object of the present invention to provide an electrified tape of which the flexible support layer is distortion-free so that its width and length will not vary with time. This feature imparts a lasting visibility to the electrified tape which, in contrast to the braided tape, will not narrow when stretched.

Another aspect of the invention is that, the electric wire network used for electrifying the tape is protected against external mechanical stresses. Any tractive force exerted on the tape will be transmitted to the flexible support layer, not to the electric conductors. Thus, the electrified tape according to the present invention has a particularly long useful life and is reliable in operation.

The electric wire network used in the electrified tape of the present invention is so arranged that in case of accidental breakage of one of the electric conductors the other conductors will compensate for this failure immediately.

An additional aspect of the invention is that it is particularly easy to use the electrified tape of the present invention. This tape can be fixed up and removed very easily, and is particularly adapted for making temporary fences.

Other features and advantages of the present invention will appear as the following description proceeds with reference to the accompanying drawings.

DESCRIPTION OF THE PREFERRED EMBODIMENT

The present invention is directed to providing an improved electrified tape for farming purposes, especially for putting up fences along the periphery of cattle pastures.

Though the present invention is intended primarily for making electrified fences, other applications may be contemplated when it is desired to associate non-insulated electric conductors with a flexible, high-strength support such as in radio aerials.

In addition to sturdiness, one of the essential properties required from an electrified tape for pasture fences or the like is its visibility. This property is definitely lacking in an electric conductor consisting of a simple, plain metal wire stretched between posts. It is for this reason that manufacturers thought of associating a network of electric conductors with a visible, flexible support such as a tape made of synthetic material such as polyethylene.

One difficulty to be overcome is the proper fixing of the network of electric conductors to the tape. Films must be definitely excluded and small-gauge electric wires must be bonded in a support layer of associated flexible yarns so as to form, for example, a woven tape.

The inconvenience of weaving is that electric conductors have a very low coefficient of elongation compared with the polyethylene yarn so that when a tractive effort is exerted on the tape the stress is supported completely by the metal wires which are liable to break in case of overload.

It is for this reason that some manufacturers use a flexible support layer of braided polyethylene yarns in which the electric conducting metal wires are incorporated to form a tape. However, this structure is unstable in the transverse direction. Thus, when the tape is stretched, the wires close up and a permanent distortion occurs. Thus, the tape width may be reduced as much as 50 percent, thus impairing considerably its visibility.

Figure 1:
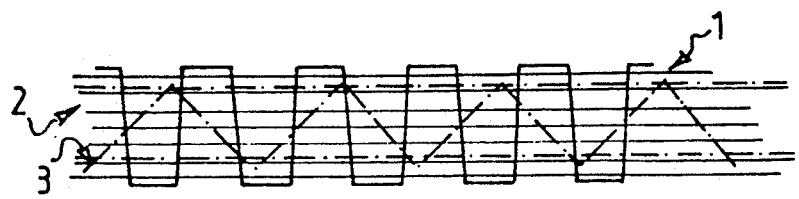
FIG. 1 is a digrammatic view of the positioning of the network of electric conductors on the basic tape structure.

FIG. 1 shows the electrified tape 1 consisting of a flexible support layer 2 in which a network of electric wires are incorporated. According to the present invention, the flexible support layer 2 comprises means for stabilizing the dimensions of the network 3. In other words, when tractive efforts are exerted on the tape 1, no reduction in the tape width is observed, and furthermore these tractive efforts are not transmitted to the electric wires.

Thus, the functions devolved to the support layer to which the stress is applied and which offers a visible surface, and to the electric wires which permit the application of a high electric potential to the tape, respectively, are positively dissociated. That is, the functions are separate and different.

Figure 2:
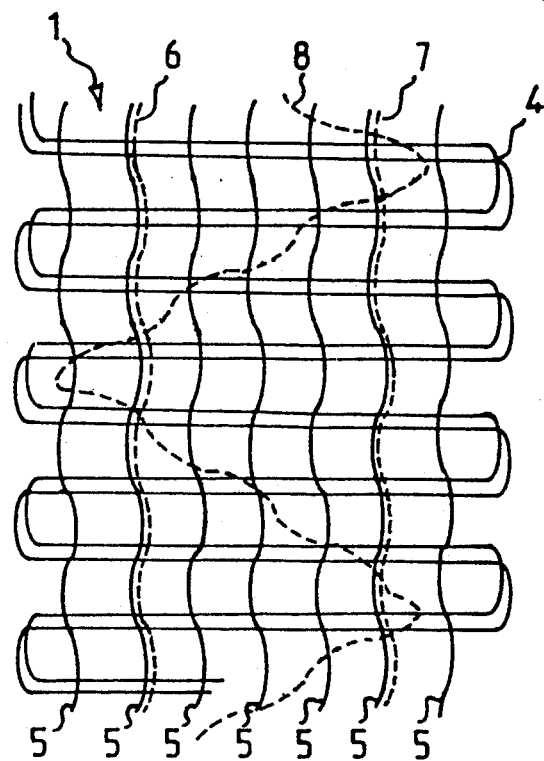
FIG. 2 is a detail view of a section of electrified tape, showing details of the warp and weft arrangement of the tape support layer.

In a particular embodiment, the means for imparting a dimensional stability to the network of electric wires comprise an interwoven warp and weft texture, as shown in FIG. 2. In a preferred embodiment, the weft 4 consists of a continuous double yarn having corrugations extending throughout the tape width. A different number of weft yarns could also be used without departing from the basic principles of the present invention. This transverse arrangement of the weft yarns 4 imparts a dimensional strength across the tape 1. In actual practice, the stresses likely to be exerted in the transverse direction are relatively moderate and the use of a double yarn is amply sufficient.

The warp yarns 5 are interwoven with the weft yarns 4 without any tightening, so that the texture is well aerated.

The network of conducting wires 3 comprises two lateral conductors 6, 7 and a zig-zag shaped central conductor 8 extending across the tape width as shown in FIG. 2. The zig-zag shaped central conductor 8 is held in permanent and regular contact with and between the lateral conductors 6 and 7. The conducting wire may consist for instance of a stainless steel having a diameter of 0.2 mm.

Figure 3:
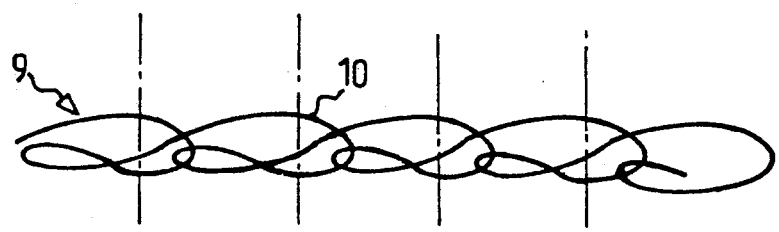
FIG. 3 illustrates the warp stitches used for fixing the texture and the network of electric conductors in the electrified tape.

The weft and warp texture 4, 5 is linked by a knitted warp 9 as illustrated in FIG. 3 (but not visible in FIG. 2). The knitted stitches 10 of warp 9 encompass each crossing of warp yarns 4 with weft yarns 5 so as to provide an interwoven texture. Moreover, the electric wires 6, 7, 8 of network 3 also extend through the stitches 10 of the knitted warp 9 so as to be linked to the texture.

Figure 4:
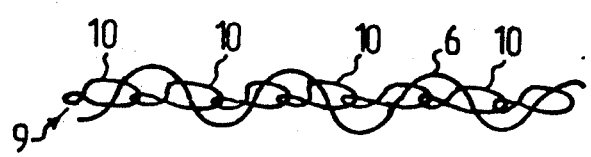
FIG. 4 illustrates the positioning of the lateral conductors in the warp stitches.

The lateral electric conductors 6, 7 are corrugated so that they pass alternatively through the knitted 10 or warp 9, as shown in FIG. 4. Thus, the lateral electric wires are not laid under tension in the longitudinal direction of the tape and when a tractive effort is exerted on the tape the conductors are not stressed. Only the corrugations undergo a certain distortion due to the resiliency of the warp yarns.

Due to its bias, the central zig-zag conductor 8 is also protected against the tractive efforts likely to be exerted on tape 1. It is so disposed between the stitches 10 of knitted warp 9 that the conducting wire 8 is shifted by one warp yarn 5 at each double warp 4, as illustrated in FIG. 2.

To ensure the electric contact between the lateral conductors 6, 7 and the central conductor, the wires 6, 7, 8 pass through the same stitches 10 at the crossing of the corresponding wefts 4. Thus, since these wires are encompassed by the same stitch, a reliable electric contact is obtained.

Of course, various modifications and changes may be brought to the form of embodiment of the present invention disclosed and illustrated herein, without departing from the basic principles of the invention.

I claim:

1. Electrified tape for enclosure fences, comprising a flexible support layer incorporating a network of electric conductors, wherein said support layer comprises interlaced weft and warp textures interwoven by a knitted warp including knitted stitches, with said knitted stitches enclosing said interlaced weft and warp textures and wires of the network of electric conductors to impart dimensional stability to said network.

2. The electrified tape of claim 1, wherein said network of electric conductors comprises two lateral conductors and a central conductor of zig-zag configuration extending across the tape width, and said knitted stitches enclose said two lateral conductors, said zig-zag conductor, and said interlaced weft and warp textures.

3. The electrified tape of claim 2, wherein said lateral conductors are corrugated.

4. The electrified tape of claim 3, wherein said texture comprises a double weft yarn.

5. The electrified tape of claim 4, wherein said zig-zag conductor is shifted by one warp yarn at each double weft yarn.

6. The electrified tape of claim 2, wherein said lateral conductors and said zig-zag conductor extend through the same stitches across the corresponding weft yarn.

7. The electrified tape of claim 4, wherein said lateral conductors extend alternately through said knitted stitches.

8. The electrified tape of claim 5, wherein said knitted stitches lock each intersection of warp and weft yarns.

* * * * *